US011912348B2

(12) United States Patent
Salter et al.

(10) Patent No.: US 11,912,348 B2
(45) Date of Patent: Feb. 27, 2024

(54) VEHICLE AND METHOD OF PROFILING A TRAILER AND DETERMINING VEHICLE DRIVING RANGE

(71) Applicant: Ford Global Technologies, LLC, Dearborn, MI (US)

(72) Inventors: Stuart C. Salter, White Lake, MI (US); Darren Palmer, Bloomfield Hills, MI (US); Ryan O'Gorman, Beverly Hills, MI (US); Peter Phung, Windsor (CA); Katherine Howard-Cone, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

(21) Appl. No.: 17/498,215

(22) Filed: Oct. 11, 2021

(65) Prior Publication Data

US 2023/0110069 A1    Apr. 13, 2023

(51) Int. Cl.
| | |
|---|---|
| *B62D 37/02* | (2006.01) |
| *G07C 5/08* | (2006.01) |
| *G01S 15/86* | (2020.01) |
| *G01S 13/86* | (2006.01) |
| *G01S 15/89* | (2006.01) |
| *G01S 13/89* | (2006.01) |

(52) U.S. Cl.
CPC ........... *B62D 37/02* (2013.01); *G07C 5/0841* (2013.01); *G01S 13/867* (2013.01); *G01S 13/89* (2013.01); *G01S 15/86* (2020.01); *G01S 15/89* (2013.01)

(58) Field of Classification Search
CPC ....... B62D 37/02; G07C 5/0841; G01S 15/86; G01S 13/867; G01S 13/89; G01S 15/89; G01S 15/88; G01S 13/931; Y02T 10/82
See application file for complete search history.

(56) References Cited

U.S. PATENT DOCUMENTS

| | | | |
|---|---|---|---|
| 6,390,215 B1 * | 5/2002 | Kodama | B60L 50/62 |
| | | | 180/2.1 |
| 7,786,849 B2 | 8/2010 | Buckley | |
| 8,380,390 B2 | 2/2013 | Sy et al. | |
| 10,119,812 B2 | 11/2018 | Singh et al. | |
| 2011/0087402 A1 | 4/2011 | Banks | |
| 2018/0001788 A1 | 1/2018 | Geuß et al. | |
| 2019/0372750 A1 * | 12/2019 | Wang | H04W 56/001 |
| 2022/0237952 A1 * | 7/2022 | Biberstein | H04N 23/90 |

FOREIGN PATENT DOCUMENTS

| | | | | |
|---|---|---|---|---|
| CN | 110383358 A | * | 10/2019 | ............... B60D 1/36 |
| DE | 102020124710 A1 | * | 4/2021 | ............... B60D 1/06 |
| SE | 543839 C2 | * | 8/2021 | |

* cited by examiner

*Primary Examiner* — Lori Lyjak
(74) *Attorney, Agent, or Firm* — Frank Lollo; Price Heneveld LLP

(57) ABSTRACT

A vehicle is provided that includes a sensor arrangement configured to sense one or more regions proximate to an exterior of the vehicle, and a controller configured to process signals generated by the sensor arrangement and to detect and generate a geometric profile of a trailer in the one or more regions proximate to the exterior of the vehicle, the controller further determining an air resistance of the trailer based on the geometric profile and calculating an expected driving range of the vehicle based on the detected air resistance.

20 Claims, 11 Drawing Sheets

VEHICLE AND METHOD OF PROFILING A TRAILER AND DETERMINING VEHICLE DRIVING RANGE

FIELD OF THE DISCLOSURE

The present disclosure generally relates to trailer towing vehicles, and more particularly relates to a vehicle that determines characteristics of a towed trailer and estimates a driving range of the vehicle.

BACKGROUND OF THE DISCLOSURE

Automotive vehicles may be configured to tow trailers having various configurations that result in various air resistances. Depending on the trailer load including the air resistance, the trailer may cause inefficiencies in the driving range of the vehicle. It may be desirable to determine the driving range of a vehicle with a particular trailer and provide improvements to the efficiency of the towing of the trailer.

SUMMARY OF THE DISCLOSURE

According to a first aspect of the present disclosure, a vehicle is provided that includes a sensor arrangement configured to sense one or more regions proximate to an exterior of the vehicle, and a controller configured to process signals generated by the sensor arrangement and to detect and generate a geometric profile of a trailer in the one or more regions proximate to the exterior of the vehicle, the controller further determining an air resistance of the trailer based on the geometric profile and calculating an expected driving range of the vehicle when towing the trailer based on the determined air resistance.

Embodiments of the first aspect of the disclosure can include any one or a combination of the following features:
the controller stores the geometric profile in memory, compares the geometric profile to other trailer profiles, and prompts a user to alter one or more properties of the trailer based on the comparison to reduce the air resistance while towing the trailer;
the altered property of the towed trailer includes altering an aerodynamic characteristic of the trailer;
the controller prompts a user to change out the trailer based on a reduced air resistance available with another trailer;
the vehicle comprises an electric vehicle;
the sensor arrangement comprises at least one of a radar sensor and an ultrasonic sensor;
the sensor arrangement comprises at least one camera;
the sensor arrangement senses the one or more regions as the vehicle travels in close proximity to the trailer;
the controller instructs a driver of the vehicle to drive the vehicle in close proximity to the trailer; and
the sensor arrangement captures the geometric profile of at least one of a side and front end of the trailer.

According to a second aspect of the present disclosure, a vehicle is provided that includes a sensor arrangement configured to sense a trailer in one or more regions proximate to an exterior of the vehicle while the vehicle travels in close proximity to the trailer; and a controller configured to process signals generated by the sensor arrangement and to detect and generate a geometric profile of the trailer, the controller further determining an air resistance of the trailer based on the geometric profile and calculating an expected driving range of the vehicle when towing the trailer based on the determined air resistance.

Embodiments of the second aspect of the disclosure can include any one or a combination of the following features:
the controller stores the geometric profile in memory, compares the geometric profile to other trailer profiles, and prompts a user to alter one or more properties of the trailer based on the comparison to reduce the air resistance while towing the trailer;
the altered property of the towed vehicle includes altering an aerodynamic characteristic of the trailer;
the controller prompts a user to change out the trailer based on a reduced air resistance available with another trailer;
the vehicle comprises an electric vehicle; and
the sensor arrangement comprises at least one of a radar sensor, an ultrasonic sensor and a camera.

According to a third aspect of the present disclosure, a method of determining an expected driving range of a vehicle with a trailer is provided. The method includes the steps of sensing one or more regions proximate to an exterior of a vehicle with a sensor arrangement located on a vehicle, detecting a trailer within the sensed one or more regions, generating a geometric profile of the trailer with the sensor arrangement, determining an air resistance of the trailer based on the geometric profile, and calculating the expected driving range of the vehicle when towing the trailer based on the determined air resistance.

Embodiments of the third aspect of the disclosure can include any one or a combination of the following features:
storing the geometric profile in memory;
comparing the geometric profile to other trailer profiles; and
prompting a user to alter a property of the trailer based on the comparison.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
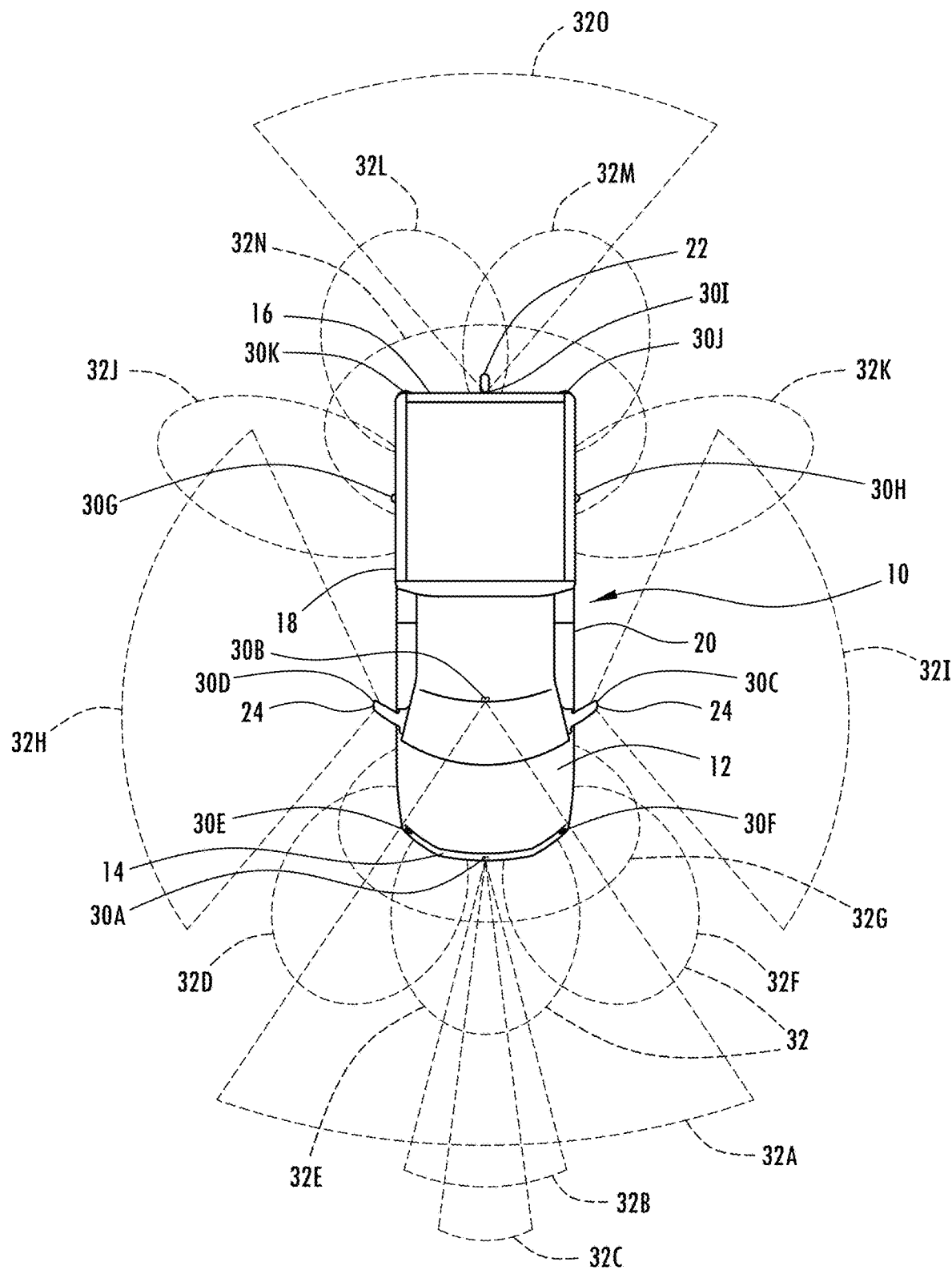
FIG. 1 is a top schematic view of a motor vehicle equipped with a tow hitch and sensors for sensing a geometric profile of a trailer.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle and method of sensing a geometric profile of a trailer and determining an expected motor vehicle driving range. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated having a vehicle body 12 defining a cabin interior that may be equipped with driver and passenger seats for transporting passengers. The vehicle 10 has a front end 14, a rear end 16 and opposite lateral right and left sides 18 and 20. The vehicle 10 is configured as a towing vehicle having a tow hitch 22 equipped with a tow ball at the rear end 16 configured to connect with a coupler on a trailer. The vehicle 10 has road wheels 26 and side view mirrors 24 located on the opposite lateral sides 18 and 20.

The vehicle 10 is further equipped with a sensor arrangement having a plurality of sensors 30A-30K located and oriented on the vehicle exterior for sensing objects within regions proximate the front and rear ends 14 and 16 and sides 18 and 20 of the vehicle 10. The plurality of sensors 30A-30K generate sensed signals indicative of one or more sensed objects. The plurality of sensors 30A-30K may include a plurality of imaging devices, such as front, rear and side facing cameras. Each of the cameras may generate images of regions around the perimeter and proximate to the vehicle 10. The generated images may be processed by video processing to identify the objects, such as a trailer and trailer features, and the position of the objects relative to the vehicle 10.

The plurality of sensors may also include radar sensors 30 shown located at each of the four corners of the vehicle 10 for sensing objects located outside of the vehicle 10 and within regions surrounding the vehicle 10. The radar sensors 30 transmit radio waves and process their reflections from objects to determine distance to the object and location of the object. Further, the plurality of sensors may include a plurality of ultrasonic sensors 32 shown located at various locations along the front portion and rear portion of the vehicle 10. The ultrasonic sensors may be spaced apart and located at or proximate to the rear end 16 and the front end 14. As such, the radar and ultrasonic sensors may detect the location, size and relative distance from the vehicle 10 to the detected objects. It should be appreciated that other sensors, such as Lidar, may be employed by the vehicle 10 to sense objects relative to the vehicle 10, and generate sensed signals that may be used to identify each object and the distance and location of the sensed object relative to the vehicle 10 for use in assisting with the sensing of objects such as the trailer and geometric features on the trailer.

The sensors 30A-30K may be dedicated or shared sensors employed on the vehicle to sense objects in sensing fields for use in other vehicle systems. For example, sensor 30A may generate sensor field 30C which may be also used for adaptive cruise control. Sensor 30A may also generate sensor field 32O which may also be used for vehicle emergency braking, pedestrian detection or collision avoidance. Sensor 30B may generate sensor field 32A which may also be used for traffic signal recognition and lane departure warning sensor 30A and along with sensors 30E and 30F may further generate sensor fields 32D, 32E and 32F which may be used for cross traffic alerts. Sensors 30D and 30C generate respective sensor fields 32H and 32I which may also be used for surround view. Sensors 30A, 30E and 30F may generate a sensor field 32G which may further be used for park assist. Sensors 30G and 30H generate respective sensor fields 32J and 32K which may be used for blind spot detection. Sensors 30K and 30J generate sensor fields 32L and 32M, respectively, which may be used for rear collision warning. Sensor 30I generates rear sensor field 32O which may also be used for park assistance and surround view. Sensors 30J, 30K and 30I may further generate sensor field 32N which may be used for park assist.

Figure 2:
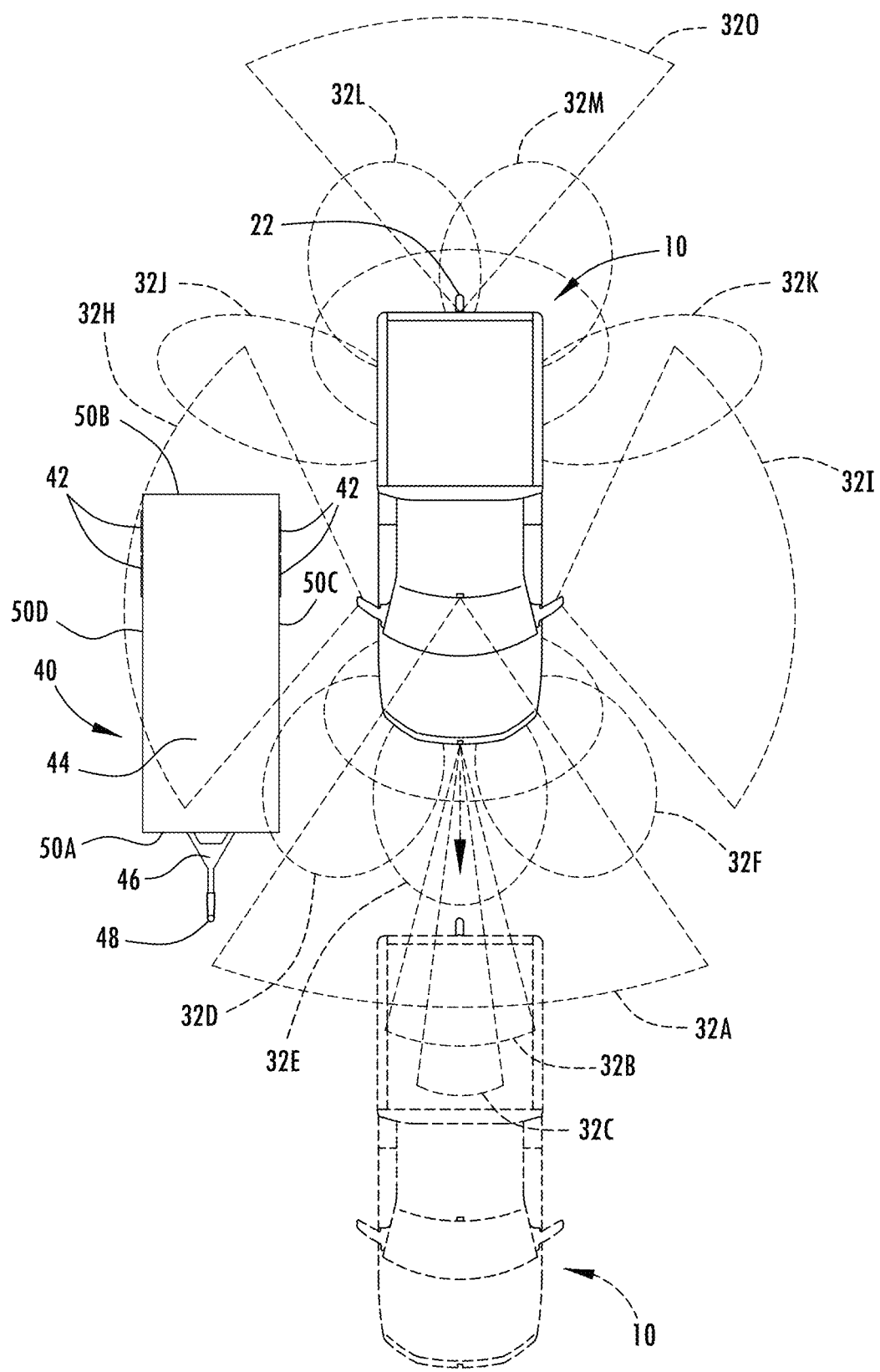
FIG. 2 is a top schematic view of the motor vehicle travelling proximate to a trailer during a trailer profile sensing process.

The tow vehicle 10 is equipped with a sensor arrangement including a plurality of sensors configured to sense an area proximate to an exterior of the vehicle, particularly in close proximity such as, for example, within 1-10 meters to a trailer to detect the trailer and geometric features of the trailer to determine a geometric profile of the trailer. Referring to FIG. 2, the tow vehicle 10 is shown traveling proximate to and along a side of a trailer 40. The trailer 40 includes a plurality of road wheels 42 and a body 44. The trailer 40 further includes a tongue 46 connected to a trailer coupler 48 at the front end thereof. The trailer coupler 48 is configured to receive a tow ball on the hitch of the tow vehicle 10 to allow the tow vehicle 10 to connect to and tow the trailer 40. The body 44 of the trailer 40 further includes a front side 50A, a rear side 50B and lateral left and right sides 50C and 50D.

In the example shown in FIG. 2, the tow vehicle 10 is traveling proximate to the trailer 40, particularly traveling proximate to the left side 50C traveling from the rear side 50B toward the front side 50A. In doing so, the tow vehicle 10 employs the sensor arrangement including one or more of sensors 30A-32K with respective sensor fields 32A-32O to sense the trailer 40 and the geometric profile of the trailer 40. For example, the geometric profile may include the size, shape and distance of the trailer and features on the trailer from the tow vehicle 10. The sensor arrangement may determine the surface contour of various features on the trailer on the rear side 50B, left side 50C and the front side 50A as the tow vehicle 10 passes from the rear side 50B along the left side 50C and forward of the front side 50A. It should be appreciated that for trailers that are generally symmetric about a longitudinal axis, that is, having the same features on the left and right lateral sides, the vehicle 10 may presume that the features detected on the left side of the trailer 50C are identical to the features on the right side 50D. However, the vehicle 10 may likewise drive along the right side 50D of the trailer 40 and sense the geometric profile of the right side of the trailer 40. Additionally, the vehicle 10 may maneuver in front of the front side 50A of the trailer 40 to allow the sensor arrangement to better determine features on the front side 50A of the trailer 40.

Figure 3:
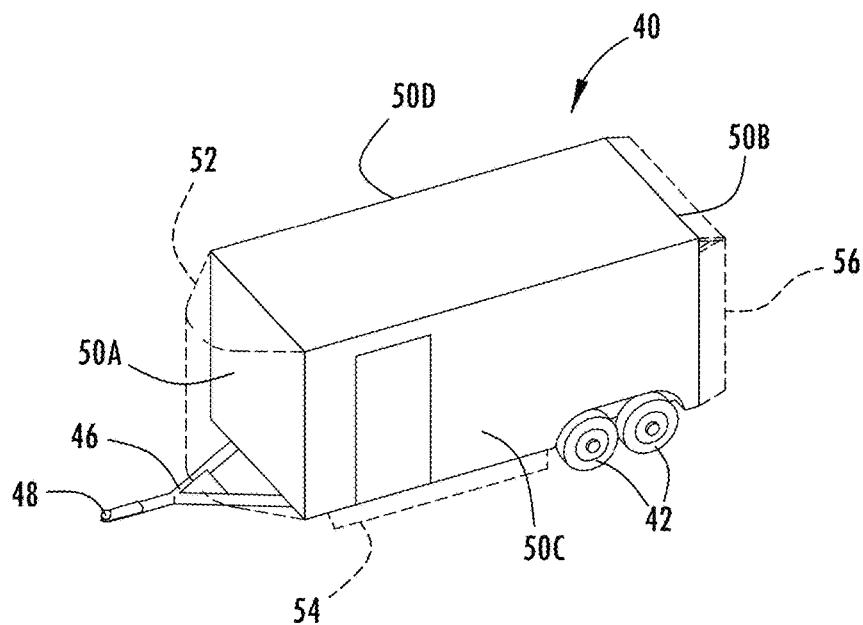
FIG. 3 is a side perspective view of a trailer having a geometric profile and selectable aerodynamic features, according to one example.

Referring to FIG. 3, one example of a trailer 40 is illustrated having various aerodynamic characteristics that may be altered to enhance or change the performance of the trailer 40 during a towing operation. For example, the trailer 40 is shown having a molded trailer nose 52 that may be adjustable to change the aerodynamic profile on the front side of the trailer 40. The trailer nose 52 has a shaped front side that is curved in this example. The trailer nose 52 may be altered in shape or replaced with another trailer nose having a different shape. Additionally, the trailer 40 may include aerodynamic side panels 54 on the left and right sides 50C and 50D of the trailer 40 which may be altered in position or shape to change the aerodynamic profile of the trailer 40. Further, the trailer 40 may include one or more trailer tails 56 at the rear side of the trailer 40 which may be adjustable in position or shape to change the aerodynamic properties of the trailer 40 during a towing operation. It should be appreciated that other features may be provided on the trailer to enable a change in the aerodynamic profile of the trailer.

Figure 4:
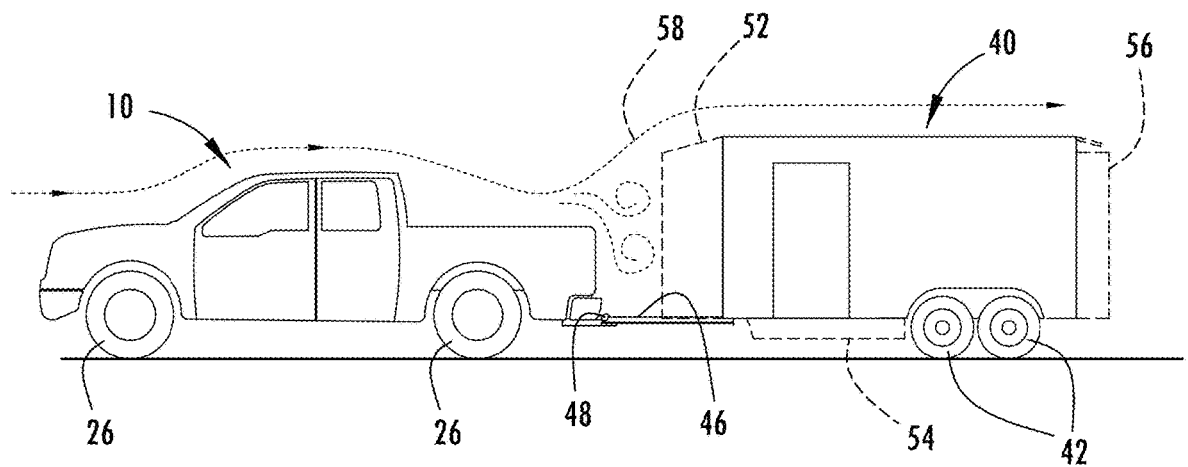
FIG. 4 is a side view of a motor vehicle towing the trailer with an aerodynamic air flow, according to one example.
Figure 5A:
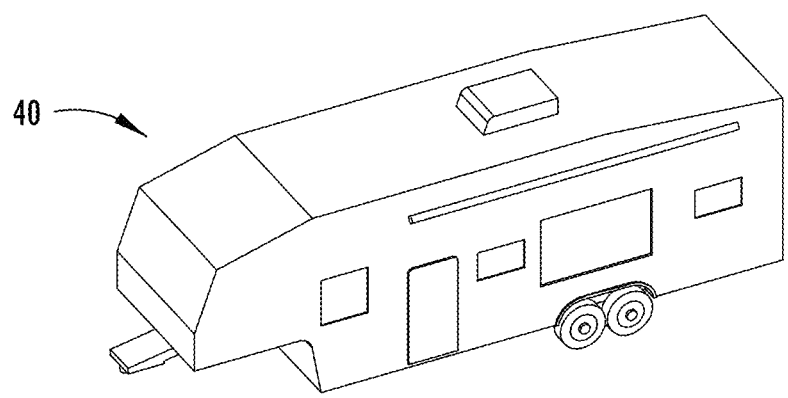
FIGS. 5A-5D illustrate examples of a plurality of selectable trailers for use with the motor vehicle.
Figure 5B:
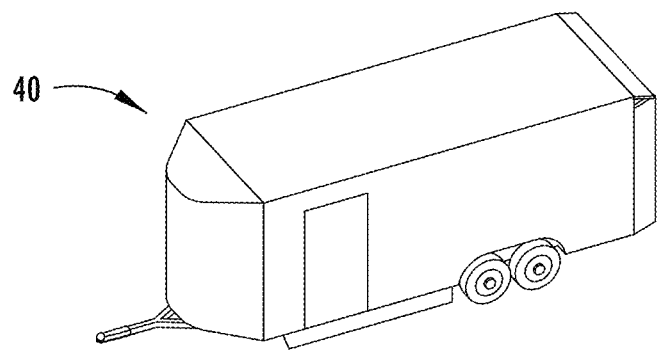
Figure 5C:
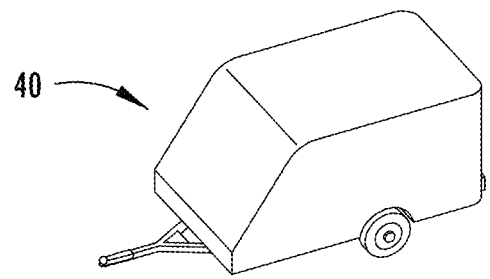
Figure 5D:
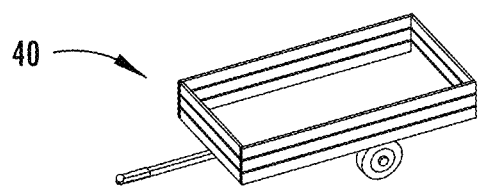

The trailer 40 is shown in FIG. 4 being towed by the vehicle 10, according to one example. As seen, air flow along path 58 passes over and around the tow vehicle 10 and is affected by the geometric profile of the trailer 40. As seen, the air flow creates an air flow resistance or aerodynamic drag that adds load and may result in inefficiencies for the vehicle 10 when towing and may reduce the driving range of the vehicle 10 during the towing operation. The vehicle 10 may determine the geometric profile of the trailer 40 and may recommend a trailer for use or may recommend a modification to the trailer to change one or more selectable features to enhance the efficiency and hence, the driving range of the vehicle 10. The vehicle 10 may advantageously determine an estimated driving range of the vehicle for a given trailer such that the driver may better manage the towing operation.

It should be appreciated that the vehicle 10 may tow any of a number of trailers. For example, a plurality of selectable trailers 40 are illustrated in FIGS. 5A-5D. The vehicle 10 may determine the geometric profile of each of the trailers shown in FIGS. 5A-5D and determine the air resistance and an expected vehicle driving range when towing a given trailer and may further output a recommendation to the driver as to which trailer may provide optimal efficiencies and optimal driving range. The vehicle 10 may notify the driver of the vehicle 10 for a given selected trailer what the driving range of the vehicle is expected to be when towing that trailer. It should be appreciated that any of a number of trailers of various sizes and configurations may be towed by the vehicle 10 and the profile thereof determined and used to estimate a driving range of the vehicle 10 during a towing operation. The vehicle controller may prompt the user to change out one trailer for another trailer to realize reduced air resistance and hence enhanced driving range.

Figure 6:
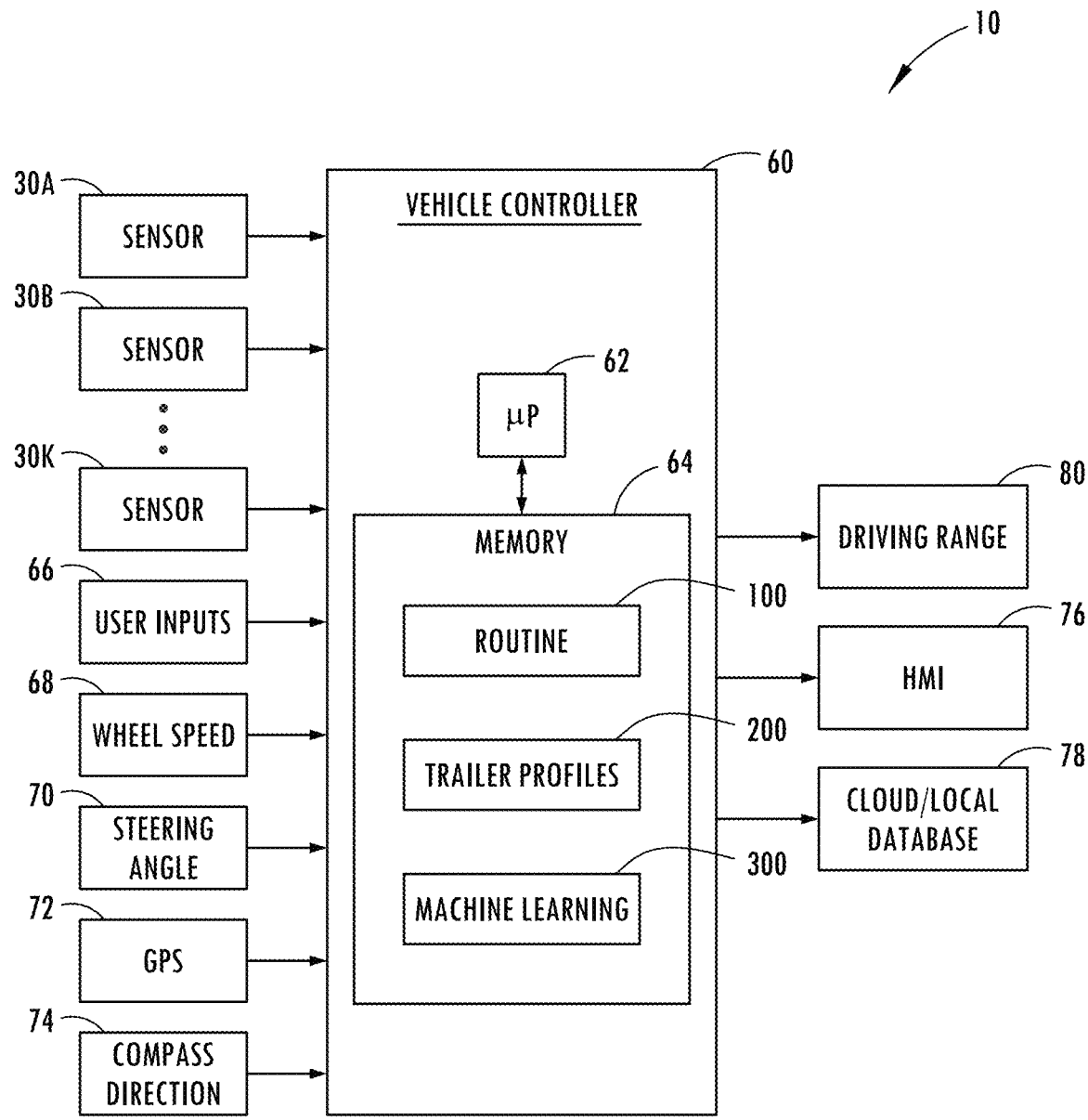
FIG. 6 is a block diagram illustrating the vehicle equipped with sensors and controls for determining a geometric profile of the trailer and determining an expected driving range of the vehicle.
Figure 7A:
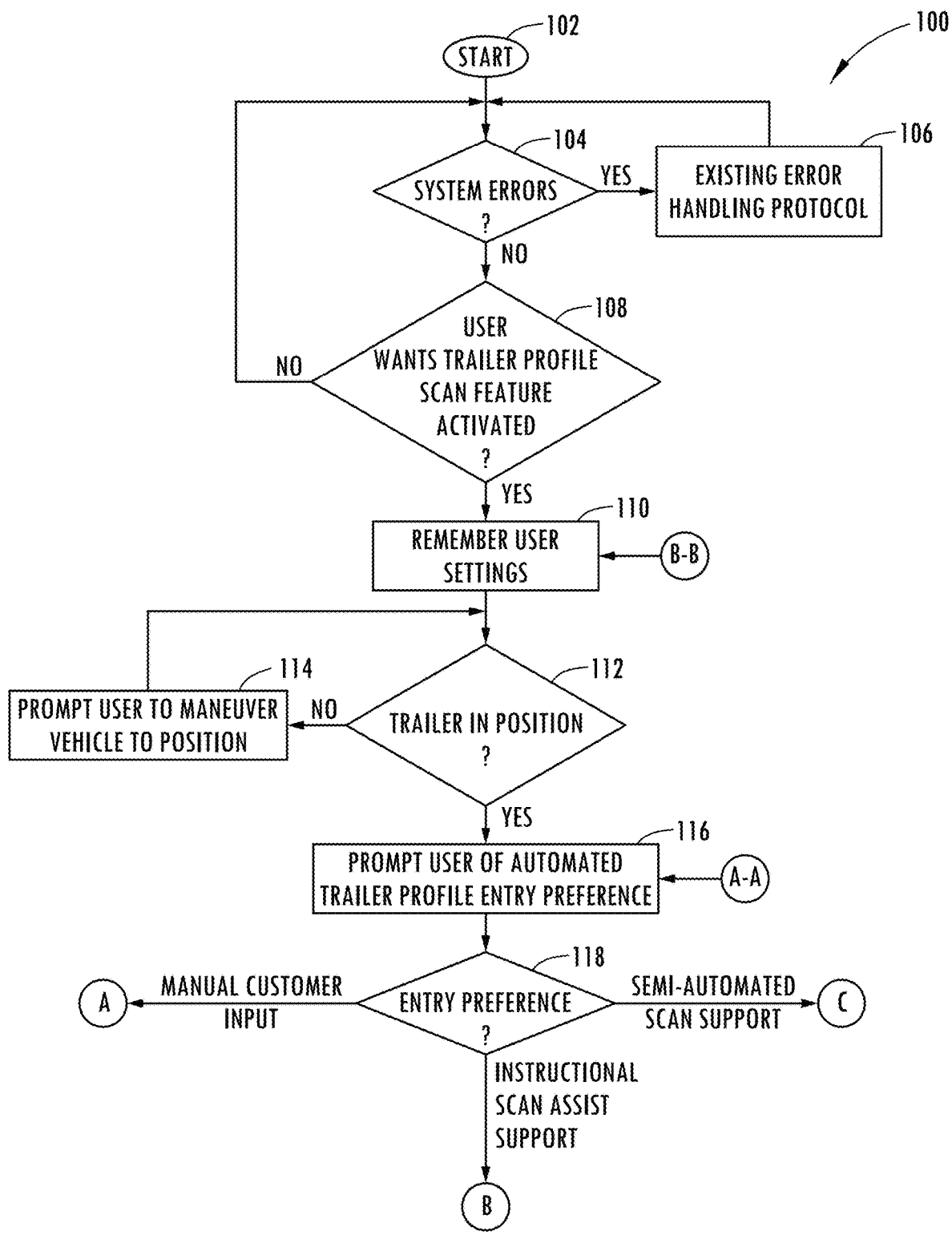
FIGS. 7A-7F is a flow diagram illustrating a routine for sensing the geometric profile of a trailer and determining an expected driving range of the vehicle.
Figure 7B:
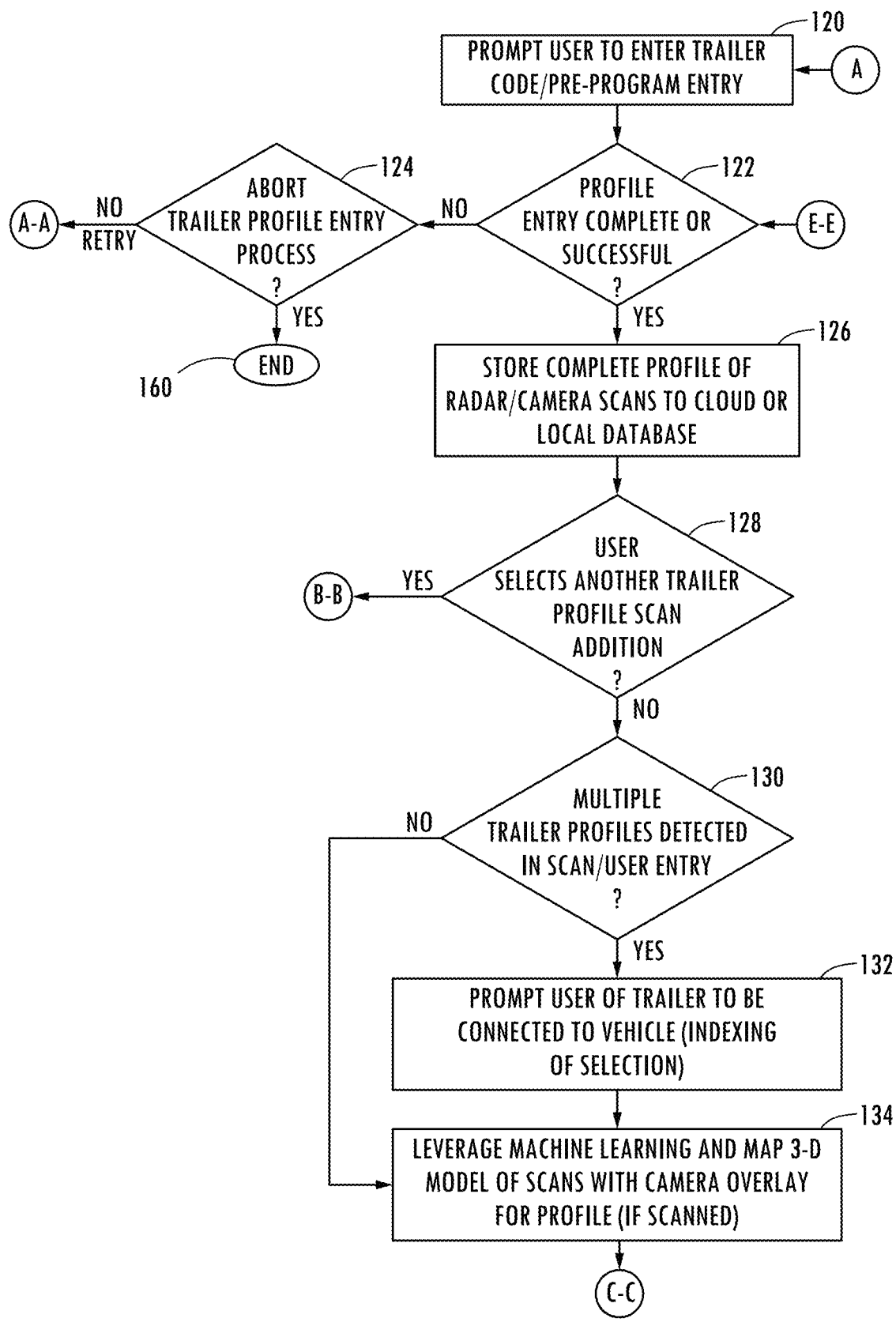
Figure 7C:
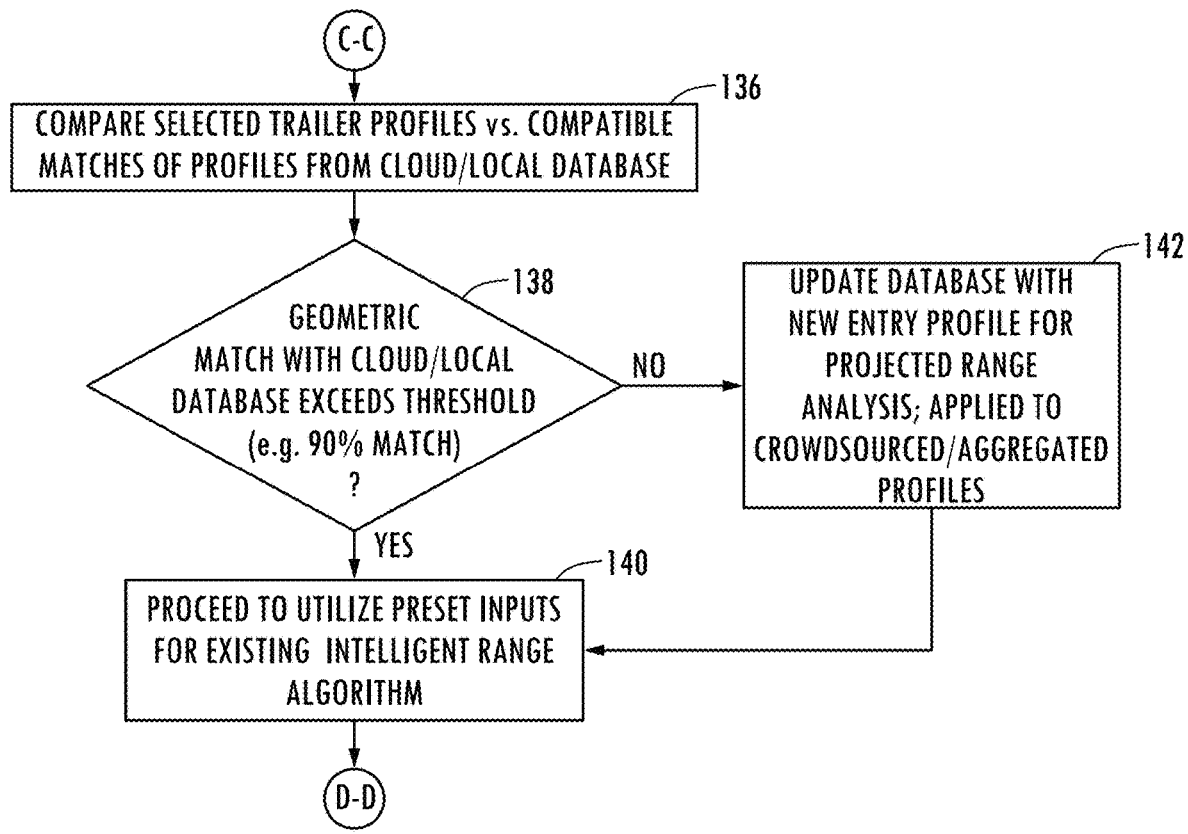
Figure 7D:
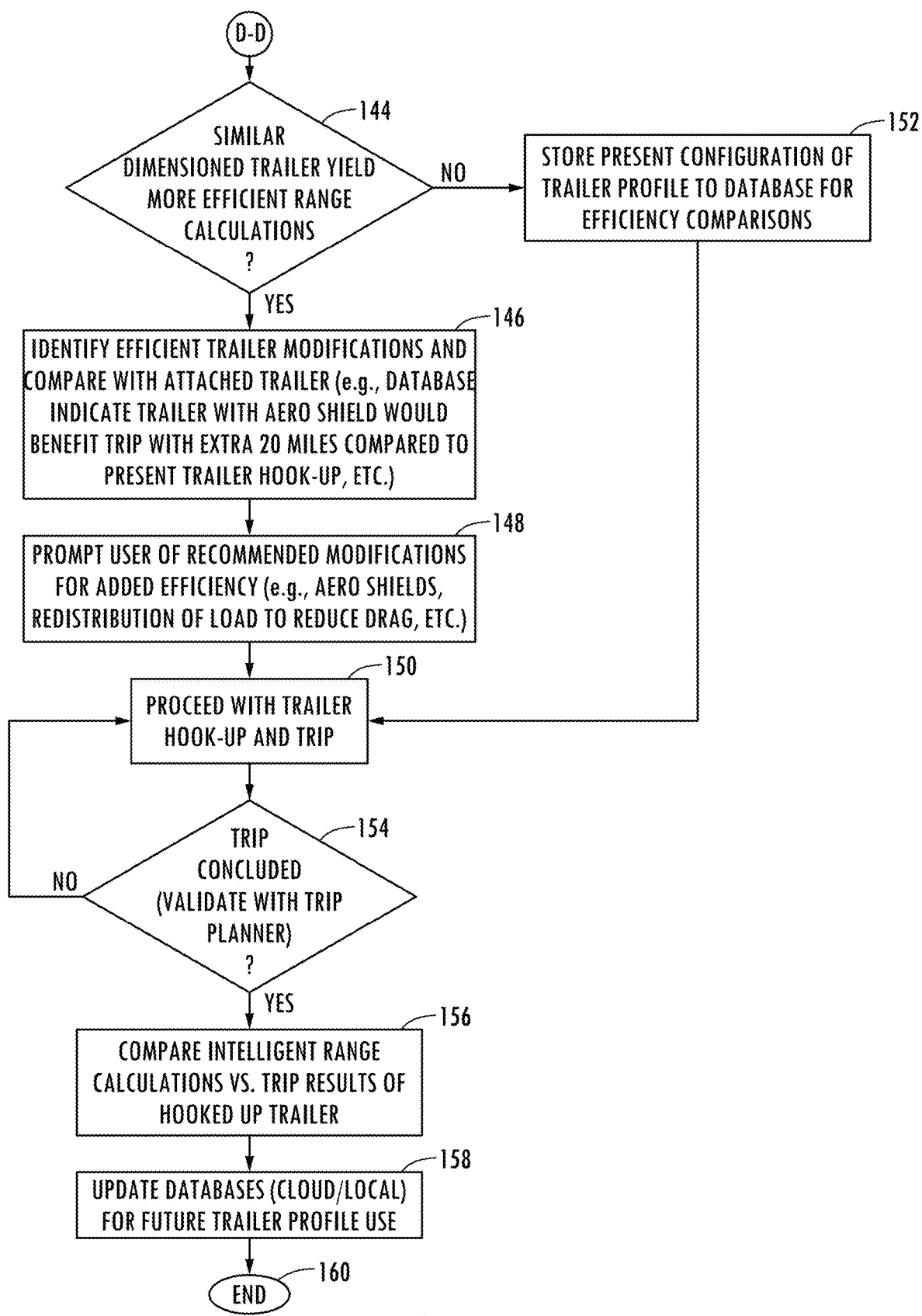
Figure 7E:
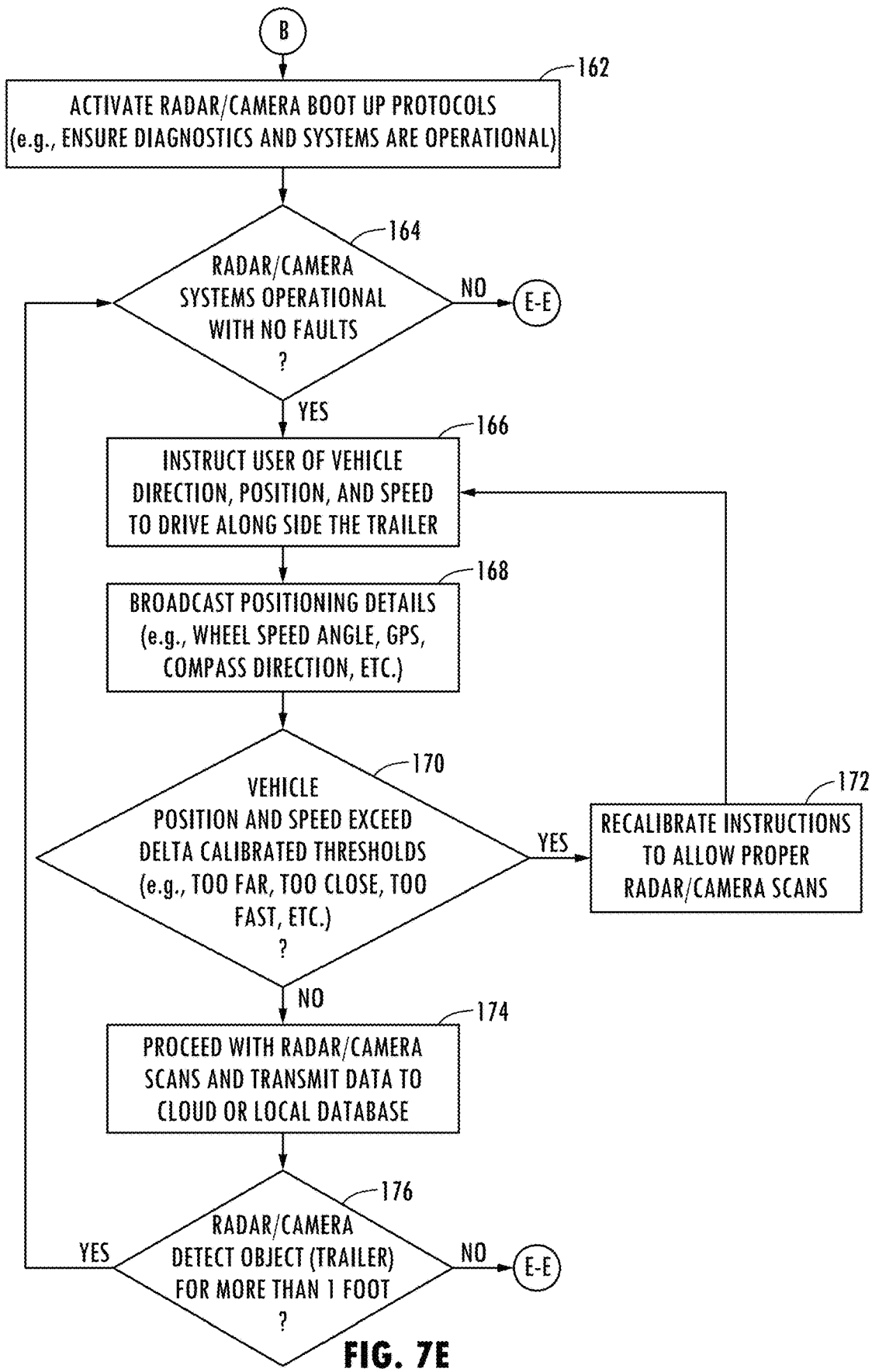
Figure 7F:
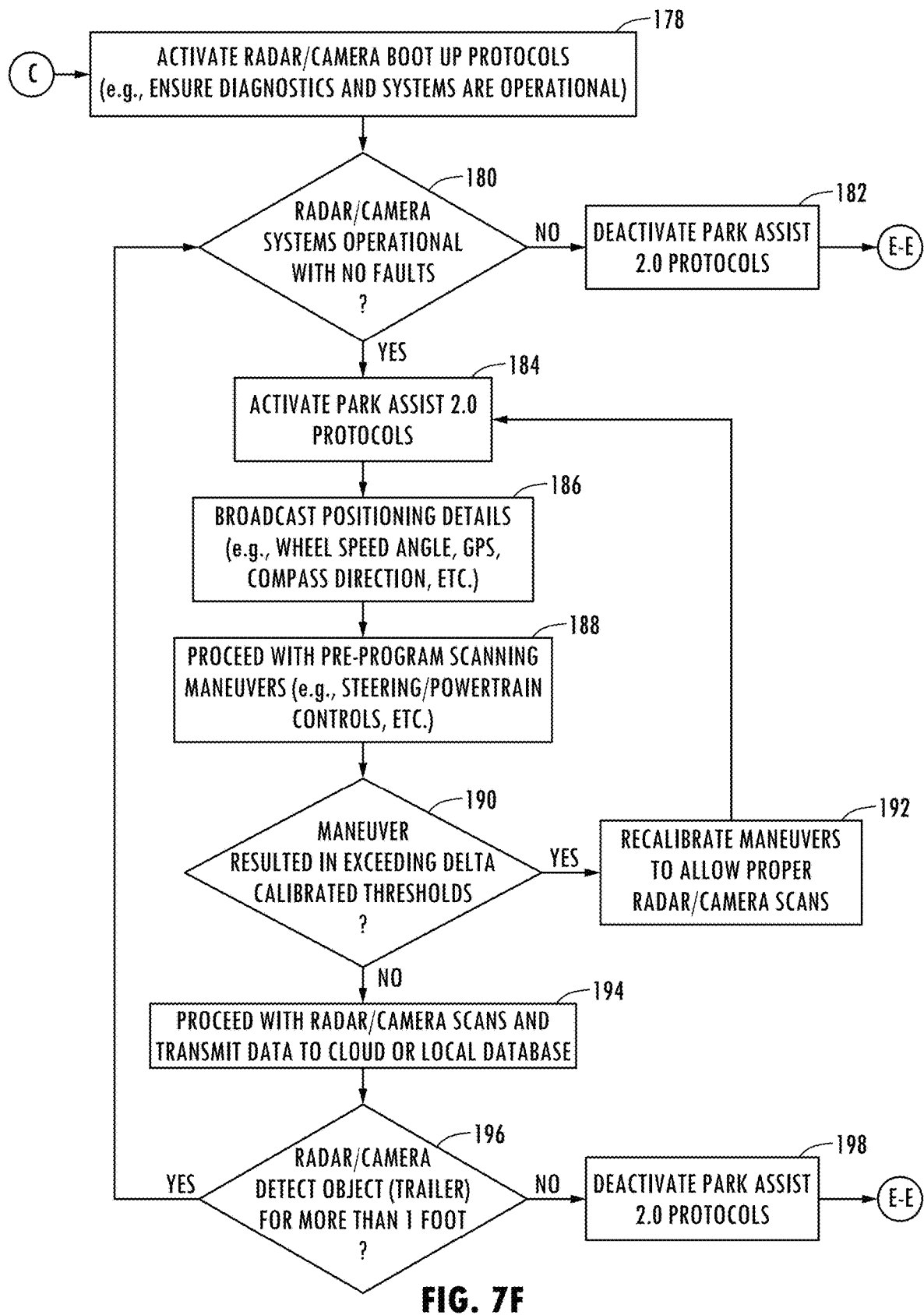

Referring to FIG. 6, the vehicle 10 is generally illustrated having a vehicle controller 60 that processes various sensor inputs including the sensor inputs 30A-30K, determines a geometric profile of a trailer sensed with the sensor inputs, and estimates the driving range of the vehicle 10 when towing with a particular trailer. The vehicle controller 60 may include control circuitry, such as a microprocessor 62 and memory 64. It should be appreciated that the vehicle controller 60 may be comprises of analog and/or digital control circuitry. Stored in memory 64 are one or more routines including routine 100 which may be executed by the microprocessor 62. In addition, various trailer profiles 200 may be stored in memory 64 and processed by microprocessor 62. The stored trailer profiles 200 may include the geometric profiles of any of a number of a plurality of trailers that may be towed by the vehicle 10. The vehicle 10 may sense and determine a geometric profile of a trailer and store the geometric profile in memory 64 for use at a future date and may further share the trailer profile with other vehicles for use in trailering that trailer. Further, memory 64 may store machine learning software 300 which may be employed to provide enhanced learning of trailer geometric profiles and estimations of the driving range of the vehicle based on the geometric profiles of the trailers.

The vehicle controller 60 receives sensor signals from each of the sensors 30A-30K. In addition, one or more user inputs 6466 may be used to input data such as trailer profile data and commands such as to activate a trailer geometric profile process to the vehicle controller 60. The user inputs 66 may include trailer weight including the trailer load weight. The wheel speed 68, steering angle 70, global positioning system (GPS) data 72 and compass direction 74 may likewise be input to the vehicle controller 60. The vehicle controller 60 processes the various sensor inputs and the other inputs to determine the geometric profiles of a trailer and to determine an air resistance of the trailer based on the geometric profile and determine the expected driving range of the vehicle when towing the trailer as described herein. The air resistance may be estimated based on known shapes and sizes of the trailer. The vehicle controller 60 may generate an output in the form of an expected driving range 80. The expected driving range may be estimated based on the air resistance and other loads such as weight of the trailer. The expected driving range may be used to determine how far the vehicle may travel based on the fuel supply and when the vehicle may need to be refueled. For example, if the vehicle is an electric vehicle, the vehicle may require electric charging of the batteries prior to or upon reaching the expected driving range limit. Additionally, the vehicle controller 60 may provide outputs to one or more HMI devices 76, such as notifications in the form of visual and/or audible outputs to the driver of the vehicle 10 to notify the driver of the expected driving range. Further, the vehicle controller 60 may output one or more signals and data to a remote cloud or local database 78 which may be utilized for use with a plurality of trailers for use with the vehicle or for use with other vehicles.

Referring to FIGS. 7A-7F, the routine 100 is illustrated, according to one example. Routine 100 begins at step 102 and proceeds to decision step 104 to determine if any system errors are present and, if so, proceeds to step 106 to perform an existing error handling protocol before returning to step 104. Provided there are no system errors, routine 100 proceeds to decision step 108 to determine if a user wants the trailer profile scan feature activated and, if not, returns to step 104. The trailer profile scan feature is a feature that enables activation of the vehicle to travel past a trailer to sense and determine the geometric profile of the trailer. The trailer profile scan feature may occur while the vehicle 10 is driven by a driver or autonomously driven. If a user wants the trailer profile scan feature activated, routine 100 proceeds to step 110 to remember or recall the user settings. For example, a prior sensed and stored trailer may be recalled. Next, routine 100 proceeds decision step 112 to determine if the trailer is in a suitable position for the trailer profile scan feature and, if not, prompts the user to maneuver the vehicle to a usable position at step 114 before returning to step 112. Once the trailer is in a proper usable position, routine 100 proceeds to step 116 to prompt the user of the automatic trailer profile entry preference. The entry preference may include a manual customer input, a structural scan assist support input and a semi-automated scan support input.

Routine 100 then proceeds to decision step 118 to determine if an entry preference has been entered. The entry preference may include a manual customer input preference, an instructional scan assist support preference, or a semi-automated scan support preference. If the entry preference is in manual customer input preference, routine 100 proceeds to step 120 to prompt the user to enter a trailer code or pre-programmed entry. Next, at decision step 122, routine 100 determines if the profile entry is complete or successful and, if not, proceeds to decision step 124 to determine if the routine should abort the trailer profile entry process. If aborted, routine 100 ends at step 160. If not, routine 100 returns to step 116 to prompt the user of a new automated trailer profile entry preference. As such, routine 100 will operate in the manual customer input mode until a new input mode is selected.

Returning to decision step 122, if the profile entry is determined to be complete or successful, routine 100 will proceed to step 126 to store the complete profile of the radar/camera sensor scans in a cloud database or to a local database. Thereafter, routine 100 proceeds to decision step 128 to determine if the user selects another trailer profile scan addition and, if so, returns to step 110 to recall the user settings. If the user does not select another trailer profile scan addition, routine 100 proceeds to decision step 130 to determine if multiple trailer profiles are detected in the scans or user entry and, if so, prompts a user of the trailer to be connected to the vehicle by indexing of the potential selections of trailer profiles at step 132. Next, at step 134, routine 100 leverages the machine learning and map 3D model of scans with camera overlay for profile if scanned. If the multiple trailer profiles are not detected and the scan/user entry, routine 100 proceeds directly to step 134.

Following the leveraging of the machine learning and map reading models, routine 100 proceeds to step 136 to compare the selected trailer profiles with compatible matches of profiles from the cloud or local database at step 136. Next, at decision step 138, routine 100 determines if the geometric profile match with the cloud/local database exceeds thresholds, such as a 90% match, for example. If so, routine 100 proceeds to step 140 to proceed to utilize preset inputs for existing intelligent range algorithm. If the geometric profile match with the cloud/local database does not exceed the threshold, routine 100 proceeds to step 142 to update the database with new entry profile for projected range analysis, applied to crowdsource/aggregated profiles, before proceeding to step 140.

Following step 140, routine 100 proceeds to decision step 144 to determine if similar dimensioned trailer yield more efficient range calculations and, if so, identifies the efficient trailer modifications and compares the attached trailer at step 146. For example, the database may indicate the trailer with aerodynamic shields that may benefit the trip with an extra vehicle driving mileage such as an extra 20 miles compared to use of the present trailer hooked up to the vehicle. Next, at step 148, routine 100 prompts the user of the recommended modifications for the added efficiency, such as adding the aerodynamic shields for redistribution of load to reduce the drag, and hence improve the aerodynamic efficiency and extend the driving range of the vehicle. A user may then implement the recommendations to extend the driving range efficiency. Thereafter, routine 100 proceeds to step 150 to proceed with the trailer hookup to the vehicle and to proceed on the trailer towing trip. Returning back to decision step 144, if the similar dimensioned trailer yield is not more efficient with the range calculations, routine 100 will proceed to step 152 to store the present configuration of the trailer profile to the database for efficiency comparisons, and then proceeds to step 150.

Following step 150, routine 100 will proceed to decision step 154 to determine if the trip is concluded and may validate the trip concluding with a trip planner. If not, routine 100 returns to step 150. If the trip is determined to be concluded, routine 100 proceeds to step 156 to compare the intelligent range calculations with the trip results of the hooked up trailer to the vehicle. Finally, routine 100 will proceed to step 158 to update the databases such as a cloud database and/or the local database for future trailer profile usage before ending at step 160.

Returning to decision step 118, if the instructional scan assist support mode is entered, routine 100 proceeds to step 162 to activate radar/camera boot up protocols such as to ensure diagnostics and systems are operational. Next, at decision step 164 routine 100 will determine if the radar/camera systems are operational with no faults and, if not, returns to decision step 122. If there are no faults with radar/camera system, routine 100 will proceed to step 166 to instruct the user of the vehicle direction, position and speed to drive alongside the trailer. Next, at step 168, routine 100 will broadcast positioning details, such as a wheel speed angle, GPS, direction heading, etc. Proceeding to decision step 170, routine 100 will determine if the vehicle position and speed exceeds delta calibrated thresholds, such as thresholds that are too far, too close or too fast, etc. If the position speed exceed the delta calibrated thresholds, routine 100 will proceed to step 172 to recalibrate instructions to allow the proper radar, camera scans, before returning to step 166. If the position and speed do not exceed the delta calibrated thresholds, routine 100 will proceed to step 174 to proceed with the radar/camera scans and transmit data to the cloud or local database. Thereafter, routine 100 proceeds to step 176 to determine if the radar/camera detect object such as a trailer for more than one foot, and, if so, returns to decision step 164. If the radar/camera detect an object for less than one foot, routine 100 returns to decision step 122.

Returning to decision step 118, if the semi-automated scan support mode is selected, routine 100 proceeds to step 178 to activate the radar/camera boot up protocols such as to ensure diagnostics and systems are operational. Next, at decision step 180, routine 100 will determine if the radar/camera systems are operational with no faults and, if not, will deactivate park assist 2.0 protocols at step 182 before returning to decision step 122. If the radar/camera systems are operational with no faults, routine 100 proceeds to step 184 to activate the park assist 2.0 protocols. The park assist 2.0 protocols allow for the vehicle to automatically drive by the trailer while sensing the geometric profile of the trailer. As such, park assist features are able to be utilized for the trailer sensing process. Next, at step 186, routine 100 will broadcast the positioning details, such as the wheel speed angle, GPS compass direction, etc., for example. At step 188, routine 100 will proceed with pre-program scanning maneuvers which may include steering and powertrain controls, for example. Routine 100 then proceeds to decision step 190 to determine if the maneuver results in exceeding the delta calibrated threshold and, if so, will proceed to step 192 to recalibrate maneuvers to allow proper radar/camera scans and return to step 184. If the maneuvers did not result in exceeding the delta calibrated thresholds, routine 100 will proceed to step 194 to proceed with the radar/camera scans and transmit data to the cloud or to a local database. Next, at decision step 196, routine 100 will determine if the radar/camera detect object, such as a trailer for more than a distance of one foot, and if so, returns to decision step 180. If the radar/camera do not detect an object, such as a trailer for more than one foot, routine 100 proceeds to step 198 to deactivate the park assist 2.0 protocols before returning to decision step 122.

Accordingly, the vehicle 10 advantageously senses a trailer proximate to the vehicle and determines a geometric profile of the trailer and further determines an air resistance of the trailer based on the geometric profile and calculates an expected driving range of the vehicle based on the detected air resistance. This advantageously provides for knowledge of the driving range of the vehicle when towing a trailer and allows the driver to enhance the efficiencies of the vehicle 10 and trailer.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
    a sensor arrangement configured to sense one or more regions proximate to an exterior of the vehicle; and
    a controller configured to process signals generated by the sensor arrangement and to detect and generate a geometric profile of a trailer in the one or more regions proximate to the exterior of the vehicle, the controller further determining an air resistance of the trailer based on the geometric profile and calculating an expected driving range of the vehicle when towing the trailer based on the determined air resistance.

2. The vehicle of claim 1, wherein the controller stores the geometric profile in memory, compares the geometric profile to other trailer profiles, and prompts a user to alter one or more properties of the trailer based on the comparison to reduce the air resistance while towing the trailer.

3. The vehicle of claim 2, wherein the altered property of the towed trailer includes altering an aerodynamic characteristic of the trailer.

4. The vehicle of claim 2, wherein the controller prompts a user to change out the trailer based on a reduced air resistance available with another trailer.

5. The vehicle of claim 1, wherein the vehicle comprises an electric vehicle.

6. The vehicle of claim 1, wherein the sensor arrangement comprises at least one of a radar sensor and an ultrasonic sensor.

7. The vehicle of claim 6, wherein the sensor arrangement comprises at least one camera.

8. The vehicle of claim 1, wherein the sensor arrangement senses the one or more regions as the vehicle travels in close proximity to the trailer.

9. The vehicle of claim 8, wherein the controller instructs a driver of the vehicle to drive the vehicle in close proximity to the trailer.

10. The vehicle of claim 9, wherein the sensor arrangement captures the geometric profile of at least one of a side and front end of the trailer.

11. A vehicle comprising:
    a sensor arrangement configured to sense a trailer in one or more regions proximate to an exterior of the vehicle while the vehicle travels in close proximity to the trailer; and
    a controller configured to process signals generated by the sensor arrangement and to detect and generate a geometric profile of the trailer, the controller further determining an air resistance of the trailer based on the geometric profile and calculating an expected driving range of the vehicle when towing the trailer based on the determined air resistance.

12. The vehicle of claim 11, wherein the controller stores the geometric profile in memory, compares the geometric profile to other trailer profiles, and prompts a user to alter one or more properties of the trailer based on the comparison to reduce the air resistance while towing the trailer.

13. The vehicle of claim 12, wherein the altered property of the towed vehicle includes altering an aerodynamic characteristic of the trailer.

14. The vehicle of claim 12, wherein the controller prompts a user to change out the trailer based on a reduced air resistance available with another trailer.

15. The vehicle of claim 11, wherein the vehicle comprises an electric vehicle.

16. The vehicle of claim 11, wherein the sensor arrangement comprises at least one of a radar sensor, an ultrasonic sensor and a camera.

17. A method of determining an expected driving range of a vehicle with a trailer, the method comprising:
- sensing one or more regions proximate to an exterior of a vehicle with a sensor arrangement located on a vehicle;
- detecting a trailer within the sensed one or more regions;
- generating a geometric profile of the trailer with the sensor arrangement;
- determining an air resistance of the trailer based on the geometric profile; and
- calculating the expected driving range of the vehicle when towing the trailer based on the determined air resistance.

18. The method of claim 17, further comprising the step of storing the geometric profile in memory.

19. The method of claim 18, further comprising the step of comparing the geometric profile to other trailer profiles.

20. The method of claim 17, further comprising the step of prompting a user to alter a property of the trailer based on the comparison.

* * * * *